United States Patent
Matsuno et al.

(10) Patent No.: US 9,889,884 B2
(45) Date of Patent: Feb. 13, 2018

(54) TRAVEL CONTROL APPARATUS FOR VEHICLE

(71) Applicant: SUBARU CORPORATION, Tokyo (JP)

(72) Inventors: Koji Matsuno, Tokyo (JP); Harunobu Horiguchi, Tokyo (JP); Shiro Ezoe, Tokyo (JP); Takayuki Nagase, Tokyo (JP); Hajime Oyama, Tokyo (JP); Yasushi Takaso, Tokyo (JP); Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 9 days.

(21) Appl. No.: 14/741,240

(22) Filed: Jun. 16, 2015

(65) Prior Publication Data

US 2015/0360721 A1  Dec. 17, 2015

(30) Foreign Application Priority Data

Jun. 17, 2014 (JP) ................................ 2014-124787

(51) Int. Cl.
*B60W 30/18* (2012.01)
*B62D 15/02* (2006.01)

(52) U.S. Cl.
CPC ... *B62D 15/0255* (2013.01); *B60W 30/18163* (2013.01); *B60W 2550/142* (2013.01); *B60W 2550/30* (2013.01); *B60W 2720/106* (2013.01)

(58) Field of Classification Search
CPC ..... B62D 15/0255; B60Q 9/00; B60W 30/00; B60W 50/00; B60W 2050/0001;
(Continued)

(56) References Cited

U.S. PATENT DOCUMENTS 5,761,629 A * 6/1998 Gilling ............... B60K 31/0008
                                                            180/169
5,999,874 A * 12/1999 Winner .............. B60K 31/0008
                                                            340/903
(Continued)

FOREIGN PATENT DOCUMENTS

DE    102010010557 A1 *  1/2011   ............ B60W 30/08
DE    102010010557 A1 *  1/2011   ............ B60W 30/08
(Continued)

OTHER PUBLICATIONS

Notification of Reasons for Refusal Japanese Patent Application No. 2014-124787 dated May 10, 2016 with full English translation.

*Primary Examiner* — Stephen Holwerda
(74) *Attorney, Agent, or Firm* — McDermott Will & Emery LLP

(57) ABSTRACT

A travel control apparatus for a vehicle detects a vehicle to be passed that is a target of passing and is in front of the vehicle equipped with the apparatus in the traveling lane thereof, detects a parallel traveling vehicle that is traveling in a lane that is adjacent to a lane to which the vehicle performs lane changing to pass the vehicle to be passed and is located on the opposite side of the lane which the vehicle to be passed is traveling, monitors the vehicle to be passed and the parallel traveling vehicle, and variably controls a passing maneuver with respect to the vehicle to be passed on the basis of a monitoring result.

14 Claims, 12 Drawing Sheets

(58) Field of Classification Search
CPC ..... B60W 30/18163; B60W 2720/106; B60W 2550/30; B60W 2550/142
See application file for complete search history.

(56) References Cited

U.S. PATENT DOCUMENTS

| | | | | |
|---|---|---|---|---|
| 6,353,788 | B1* | 3/2002 | Baker | B60K 31/0008 340/435 |
| 2002/0021229 | A1* | 2/2002 | Stein | B60K 31/0008 340/933 |
| 2003/0163239 | A1* | 8/2003 | Winner | B60K 31/0008 701/93 |
| 2005/0216172 | A1* | 9/2005 | Schroder | B60K 31/0008 701/96 |
| 2008/0162010 | A1* | 7/2008 | Klotz | B60K 31/0008 701/93 |
| 2009/0234553 | A1* | 9/2009 | Sekiguchi | B60W 30/16 701/96 |
| 2012/0078484 | A1* | 3/2012 | Kato | B60W 30/143 701/96 |
| 2013/0297172 | A1 | 11/2013 | Ariga et al. | |

FOREIGN PATENT DOCUMENTS

| | | |
|---|---|---|
| JP | 2009-248892 A | 10/2009 |
| JP | 2010-036862 A | 2/2010 |
| JP | 2014-016888 A | 1/2014 |
| WO | 2012/098667 A1 | 7/2012 |

* cited by examiner

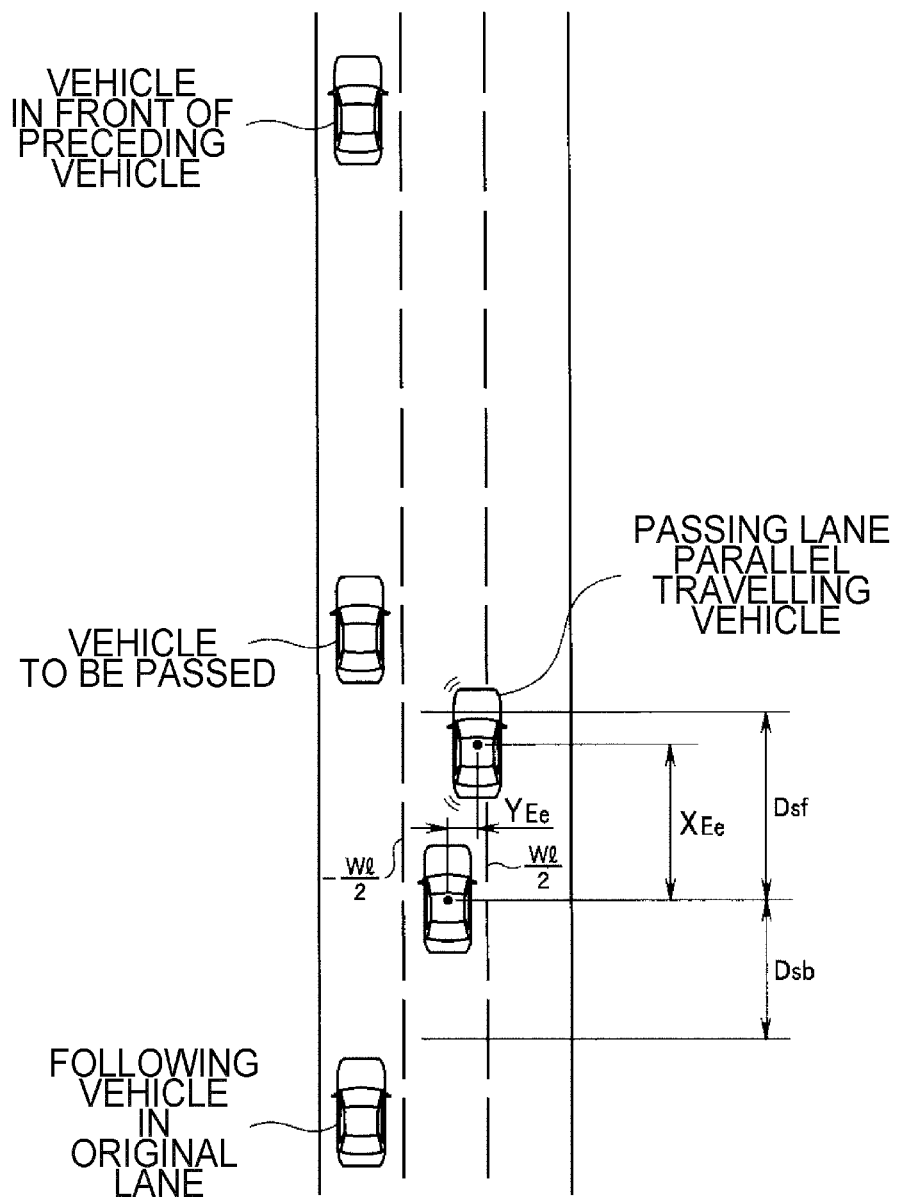

TRAVEL CONTROL APPARATUS FOR VEHICLE

CROSS-REFERENCE TO RELATED APPLICATIONS

The present application claims priority from Japanese Patent Application No. 2014-124787 filed on Jun. 17, 2014, the entire contents of which are hereby incorporated by reference.

BACKGROUND

1. Technical Field

The present invention relates in particular to a travel control apparatus for a vehicle capable whereby another vehicle in front in the same lane can be passed by automatic travel technology.

2. Related Art

In recent years, various devices have been developed and proposed in which automatic driving technology is used in a vehicle so as to allow a driver to perform safe and pleasant driving. For example, Japanese Unexamined Patent Application Publication (JP-A) No. 2009-248892 discloses a travel control system, in which the suitability of passing a preceding vehicle is determined by a vehicle equipped with the travel control system on the basis of a traveling state of the vehicle and the preceding vehicle. When it is determined that passing of the preceding vehicle is suitable, a passing preparations operation is performed. Then when it is recognized, on the basis of the travel environment and traveling state of the vehicle and the preceding vehicle, for instance, that the vehicle and the preceding vehicle are traveling along on a lane of a road having multiple lanes in each direction, there are no traffic lights and/or intersections or the like within a predetermined distance range in front, there are no other preceding vehicles in the passing path, and there is no following vehicle which might enter into the passing path, it is determined that passing of the preceding vehicle is possible, and passing is performed.

According to the technology of the travel control system according to JP-A No. 2009-248892, passing is performed in accordance with the travel environment (presence/absence of intersections and traffic lights), and preceding vehicles in the passing path, when the vehicle is seeking to perform a passing maneuver, and therefore it is possible to achieve a safe passing maneuver. However, passing a preceding vehicle which is the target of passing involves performing a complex combination of driving operations, such as lane changing in order to implement passing, accelerating after lane changing and lane changing back to the original lane after the acceleration for passing. Due to the traveling state of a following vehicle and a parallel traveling vehicle that is traveling in a lane that is adjacent to a lane to which the subject vehicle performs lane changing to pass the vehicle to be passed and is located on the opposite side of the lane in which the vehicle to be passed is traveling, there are cases where, for instance, it is desirable not to perform the passing maneuver, or where it is desirable to return to the original lane without passing the preceding vehicle, even after lane changing for passing, or and the passing maneuver must be performed by predicting these situations accurately.

SUMMARY OF THE INVENTION

The present invention was devised in view of the above-mentioned circumstances, an object thereof being to provide a travel control apparatus for a vehicle in which, when implementing passing control using automatic driving technology, if it is desirable not to implement an actual passing maneuver, or it is desirable to return to the original lane without passing the preceding vehicle, even after lane changing in order to implement passing, for instance, due to the traveling state of a following vehicle and a parallel traveling vehicle that is traveling in a lane that is adjacent to a lane to which the subject vehicle performs lane changing to pass the vehicle to be passed and is located on the opposite side of the lane in which the vehicle to be passed is traveling, this information is gathered appropriately, and the driver can be duly notified or the vehicle can automatically perform lane changing back to the original lane or the like.

An aspect of a travel control apparatus for a vehicle according to the present invention includes: a peripheral environment recognition unit that recognizes peripheral environment information on peripheral environment in which the vehicle is traveling; a travel information detection unit that detects travel information on travel of the vehicle; a vehicle to be passed detection unit that detects a vehicle to be passed on the basis of the peripheral environment information and the travel information, the vehicle to be passed being a target of passing located in front of the vehicle in a traveling lane thereof; a parallel traveling vehicle detection unit that detects a parallel traveling vehicle on the basis of the peripheral environment information, the parallel traveling vehicle being traveling in a lane that is an adjacent to a lane to which the vehicle performs lane changing to pass the vehicle to be passed and is located on the opposite side of the lane in which the vehicle to be passed is traveling; a passing control unit that monitors the vehicle to be passed and the parallel traveling vehicle, and variably controls a passing maneuver with respect to the vehicle to be passed, on the basis of a monitoring result; and a notification unit that issues a notification about a control status performed by the passing control unit.

BRIEF DESCRIPTION OF THE DRAWINGS

FIGS. 9A and 9B are illustrative diagrams of travel control during monitoring of a following vehicle in the original lane in the first-stage and second-stage accelerations in FIG. 4, in which FIG. 9A shows a case of returning behind the following vehicle in the original lane and FIG. 9B shows a case of returning behind the vehicle to be passed, according to the example;

FIG. 10 is an illustrative diagram of travel control during monitoring of the parallel traveling vehicle, in the first-stage and second-stage accelerations in FIG. 5 according to the example;

DETAILED DESCRIPTION

An example of the present invention is described hereinafter with reference to the drawings.

Figure 1:
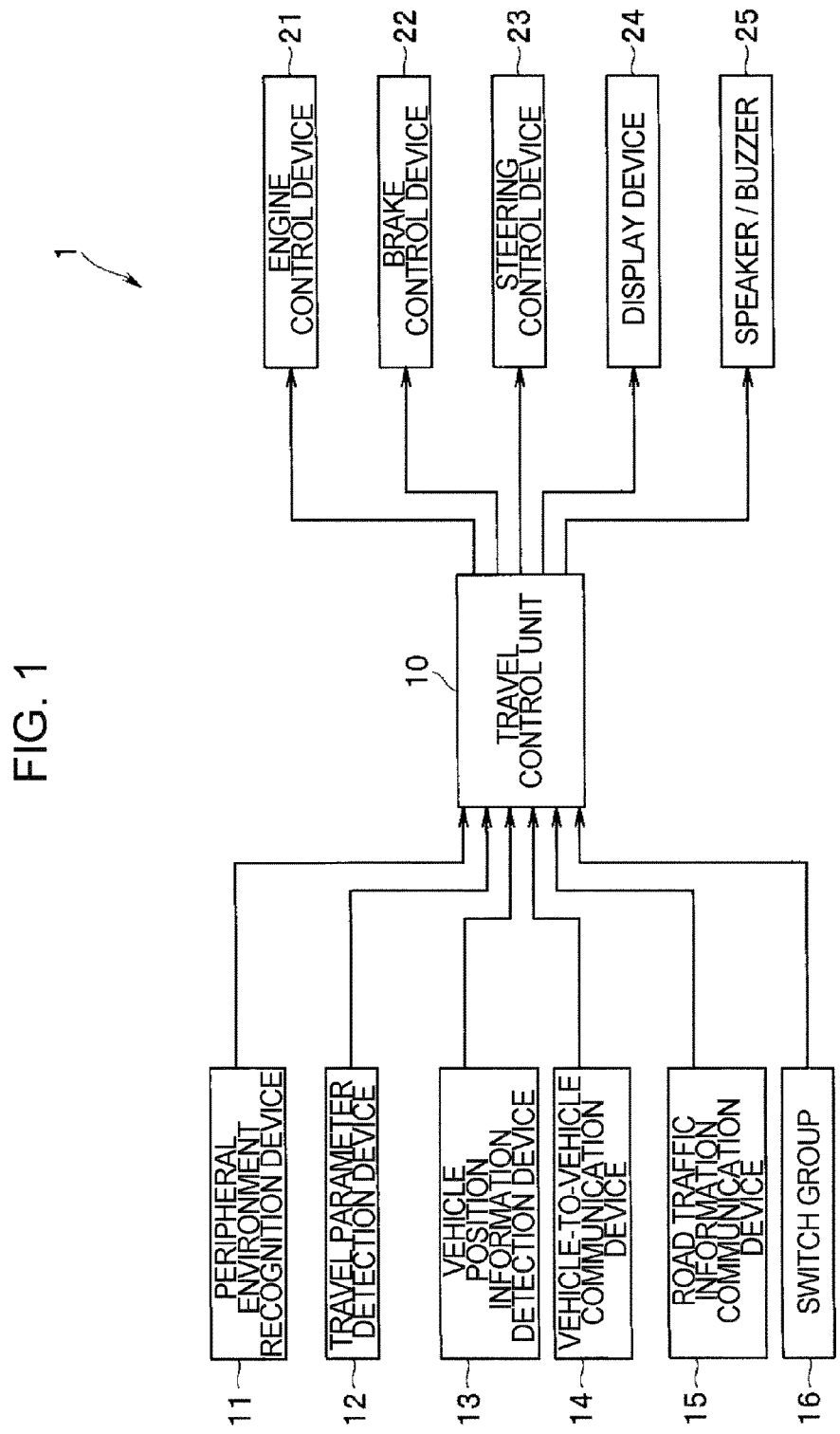
FIG. 1 is a general schematic drawing of a travel control apparatus for a vehicle according to an example of the present invention.

In FIG. 1, reference numeral 1 indicates a travel control apparatus for a vehicle. In the travel control apparatus 1, various input devices, such as a peripheral environment recognition device 11, a travel parameter detection device 12, a vehicle position information detection device 13, a vehicle-to-vehicle communication device 14, a road traffic information communication device 15 and a switch group 16, and various output devices, such as an engine control device 21, a brake control device 22, a steering control device 23, a display device 24 and a speaker/buzzer 25, are connected to a travel control unit 10.

The peripheral environment recognition device 11 includes a camera device (stereo camera, single-eye camera, color camera, or the like; not illustrated) provided with a solid-state imaging element, or the like, which is disposed inside a vehicle cabin of a vehicle equipped with the travel control apparatus 1 (hereinafter referred to as "subject vehicle") and acquires image information by capturing images of the external environment of the vehicle, and a radar device (laser radar, milliwave radar, ultrasonic radar, or the like; not illustrated) that receives reflected waves from objects present in the periphery of the vehicle.

On the basis of the image information captured by the camera device, the peripheral environment recognition device 11 performs a well-known grouping process in accordance with distance information, for example, and by comparing the grouped distance information with predetermined three-dimensional road shape data and object data, etc., extracts the relative position (distance and angle) from the subject vehicle of lane line data, side wall data for guard rails and kerbs, etc. located alongside the road, and object data for vehicles and the like, together with the velocity.

Furthermore, the peripheral environment recognition device 11 detects the positions (distance and angle) in which reflecting objects are present, together with the velocity, on the basis of the reflected wave information acquired by the radar device. In this way, the peripheral environment recognition device 11 is provided as the peripheral environment recognition unit of the appended claims in this example.

The travel parameter detection device 12 detects the traveling state of the subject vehicle, and more specifically, a vehicle velocity V, an accelerator opening degree θth, a throttle opening degree θth, a road surface gradient Ug of a road surface on which the vehicle is traveling (an uphill gradient is indicated by "+"), and an estimated road surface coefficient of friction μe, and the like. In this way, the travel parameter detection device 12 is provided as the travel information detection unit.

The vehicle position information detection device 13 is a well-known navigation system, for example. The vehicle position information detection device 13 receives, for example, radio waves transmitted from a Global Positioning System (GPS) satellite, detects a current position on the basis of the radio wave information, and specifies the subject vehicle position on map data that is previously stored on a flash memory, compact disc (CD), digital versatile disc (DVD), Blu-ray (registered trademark) disk, hard disk drive (HDD), or the like. The previously stored map data includes road data and facilities data. The road data includes information on the position and type of links, information on node and link connection relationship, type information, and information on node and link connection relationships. The facilities data has a plurality of records for each facility, and each record includes name information on the facility in question, current position information, and facility type information (department store, shop, restaurant, parking place, public park or vehicle repair garage). Thereupon, when the subject vehicle position is displayed on the map and a destination point is input by an operator, a path from a departure point to the destination point is calculated in a predetermined manner and shown on the display device 24, such as a display panel and monitor, whereby guidance can be provided by voice instructions by the speaker/buzzer 25.

The vehicle-to-vehicle communication device 14 includes a narrow-band wireless communication device having a communication area of approximately 100 [m], such as a wireless LAN, and performs direct communications with other vehicles without routing via a server, or the like, and can thereby transmit and receive information. Two-way communications with other vehicles are made to exchange vehicle information, travel information, traffic environment information, and the like. The vehicle information includes specific information indicating a vehicle type (in the example, type information such as passenger vehicle, truck, and two-wheeled vehicle). The travel information includes vehicle velocity, position information, brake lamp lighting information, blinking information of turn-signal lamps emitted when turning right or left, and blinking information of hazard lamps that blink when a vehicle makes an emergency stop. The traffic environment information includes information that varies in accordance with circumstances, such as road congestion information and road works information.

The road traffic information communication device 15 is a so-called "Vehicle Information and Communication System" (VICS) (registered trademark) that receives in real time road traffic information on congestion, accidents, road works, required travel times and parking places, from an FM multiplex broadcast and/or transmitters on the roadway, and displays the received traffic information on the previously stored map data described above.

The switch group 16 includes switches relating to driving assistance control for the driver, such as a switch for implementing travel control to set the velocity to a predetermined constant velocity, a switch for implementing tracking control to keep the distance or time to a preceding vehicle at a predetermined constant value, a switch for lane keeping control to keep the vehicle in a set traveling lane, a switch for implementing lane deviation prevention control for preventing deviation from the traveling lane, a passing control implementation permission switch for enabling the implementation of passing control in relation to a preceding vehicle (vehicle to be passed), a switch for setting the vehicle velocity, vehicle-to-vehicle distance, vehicle-to-vehicle time, speed limit, and the like, required for each of these controls, and a switch for cancelling these controls.

The engine control device 21 is, for example, a well-known control unit that implements principal controls relating to the engine (not illustrated) of the vehicle, such as fuel injection control, ignition timing control, control of an electronically-controlled throttle valve, traction control for preventing idle rotation of the tires, and the like, on the basis of the intake air volume, the throttle opening degree θth, the engine water temperature, the air intake temperature, the oxygen concentration, the crank angle, the accelerator opening degree θacc, and other vehicle information. The engine control device 21 receives from the travel control unit 10 a target acceleration (d2X/dt2)t and/or target velocity V2, and an instruction to change the characteristics of the throttle opening degree θth in accordance with the accelerator opening degree θacc.

Examples of the brake control device 22 include a well-known antilock brake System and a well-known control unit that implements sideslip prevention control. The brake control device 22 is capable of controlling the brake devices (not illustrated) of the four wheels independently of a braking operation by the driver, on the basis of the brake switch, the wheel velocities of the four wheels, the steering wheel angle, the yaw rate, and other vehicle information, and thereby implementing well-known an anti-lock brake system and/or lateral slip prevention, and the like. When a deceleration instruction, or the like, is output from the travel control unit 10, the brake control device 22 implements braking control in accordance with the deceleration instruction value.

The steering control device 23 is, for example, a well-known control device that controls an assistance torque provided by an electric power steering motor (not illustrated) provided in the steering system of the vehicle, on the basis of the vehicle velocity V, steering torque, steering wheel angle, yaw rate, and other vehicle information, for example. The steering control device 23 is capable of lane keeping control to keep the vehicle in a set traveling lane, and lane deviation prevention control for preventing deviation from the traveling lane, and is composed so as to implement control by calculating the steering angle or steering torque required for the lane keeping control and lane deviation prevention control. When implementing passing maneuver control, the target steering wheel angle θHt required for passing the vehicle to be passed or for returning to the original lane, is input to the steering control device 23 from the travel control unit 10. In this way, the steering control device 23 is provided as the steering control unit of the appended claims in the example.

The display device 24 is, for example, a device that issues a visual warning or notification to the driver, such as a monitor, display panel, and warning lamp. The speaker/buzzer 25 is a device that issues an audible warning or notification to the driver, and the display device 24 and the speaker/buzzer 25 are provided as the notification unit of the appended claims in the example.

The travel control unit 10 recognizes the traveling lane of the subject vehicle (original lane when lane changing is performed), a lane that is adjacent to the travelling lane of the subject vehicle (original lane) and to which the subject vehicle performs lane changing in order to pass the vehicle to be passed (hereinafter referred to as "passing lane"), and a lane that is adjacent to a lane to which the vehicle performs lane changing to pass the vehicle to be passed and is located on the opposite side of the lane in which the vehicle to be passed is travelling, which will be described later, together with positional information, on the basis of respective input signals from the various devices 11 to 16 described above. The travel control unit 10 also recognizes a preceding vehicle in the traveling lane of the subject vehicle, and a pre-preceding vehicle in front of the preceding vehicle, and recognizes, for example, the preceding vehicle in the traveling lane of the subject vehicle as a vehicle to be passed. Moreover, the travel control unit 10 recognizes a following vehicle that is traveling behind the subject vehicle in the traveling lane of the subject vehicle is as a following vehicle in the original lane. Furthermore, the travel control unit 10 recognizes a nearest vehicle that is traveling in that lane which is adjacent lane to a lane to which the vehicle performs lane changing for passing to pass the vehicle to be passed and is located on the opposite side to of the lane in which the vehicle to be passed is traveling as a parallel traveling vehicle, and, also recognizes other vehicles traveling in this lane. For each of the preceding vehicle, the pre-preceding vehicle in front of the preceding vehicle, the vehicle to be passed, the following vehicle in the original lane, the parallel traveling vehicle, and the other vehicles, information such as distance information from the subject vehicle, relative velocity information, velocity information that incorporates the velocity of the subject vehicle, blinking information of the turn-signal lamps, and other information, is detected based on image information, radar transmission/reception information, vehicle-to-vehicle communications, and the like. Then, for example, when a passing control implementation input has been made via the switch group 16, passing maneuver control with respect to the vehicle to be passed is performed using the automatic driving technology.

Figure 2:
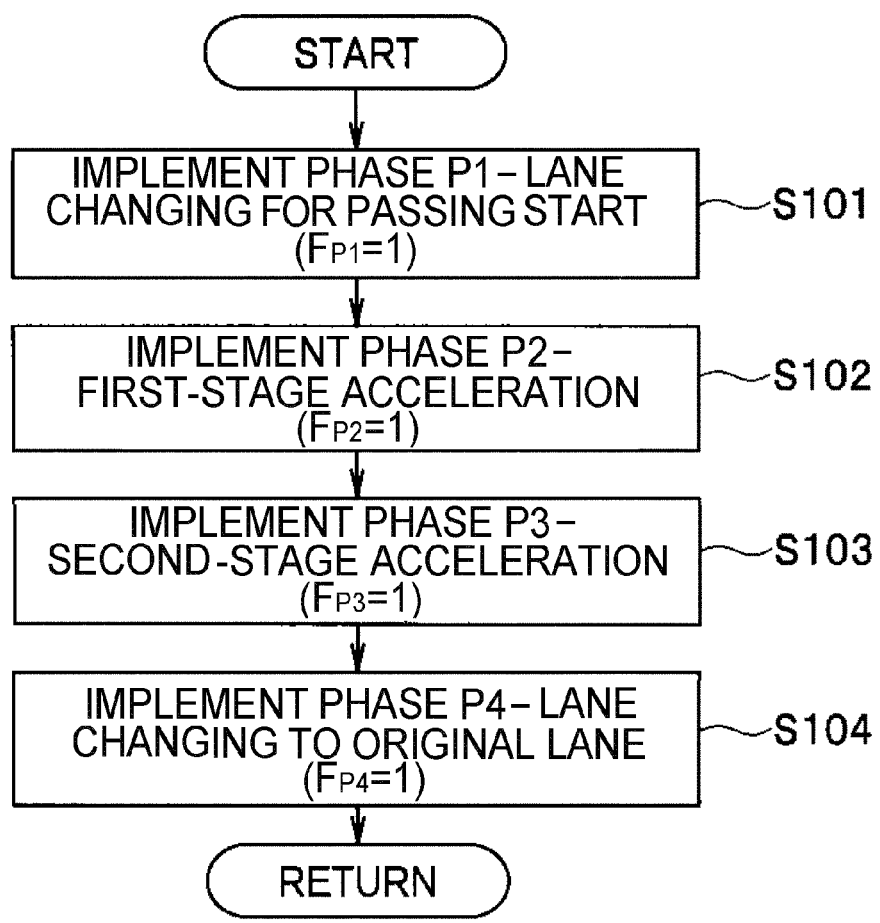
FIG. 2 is a flowchart of a passing maneuver control program according to the example.

In the travel control unit 10 according to the example, the passing maneuver control is performed in four phases that are a phase P1 in which lane changing is performed for passing start, a phase P2 in which first acceleration is performed, a phase P3 in which second acceleration is performed, and a phase P4 in which lane changing is performed to return to the original lane, as in the flowchart in FIGS. 2 and in 7. The travel control in each of these phases is described below.

Figure 7:
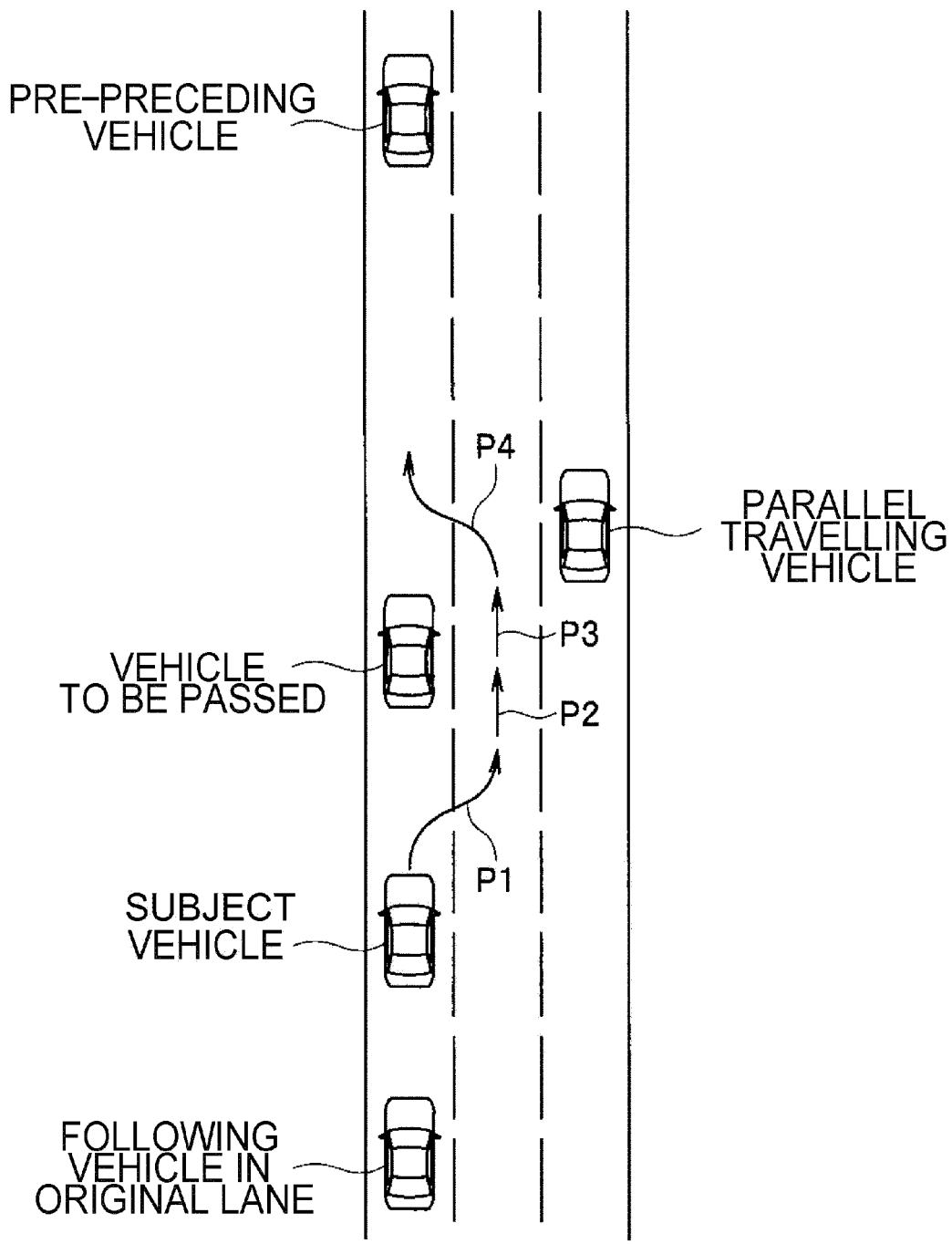
FIG. 7 is an illustrative diagram of respective phases of passing maneuver control according to the example.

FIG. 2 is a flowchart showing an overall program for passing maneuver control, and firstly, in step 101 (hereinafter, step is abbreviated to "S"), the phase P1 in FIG. 7 is implemented. While the travel control unit 10 is implementing the phase P1, a flag Fp1 is that indicates that lane changing for passing start is under progress set (Fp1=1).

In the example, the vehicle trajectory when the subject vehicle performs lane changing is obtained, for example, by a normalized polynomial for a minimum-jerk (∫d³y/dx³) trajectory, using two-dimensional coordinates (taking the position of the subject vehicle as a point of origin) in which the travel distance is the x direction and the amount of lateral movement (lane changing width) is the y direction.

In this case, the following equations are satisfied, y(0)=0, y(1)=1, dy(0)/dx=d²y(0)/dx²=0, dy(1)/dx=d²y(1)/dx²=0, and Equation (1) below is obtained.

$$y = 6 \cdot x5 - 15 \cdot x4 + 10 \cdot x^3 \tag{1}$$

Equations (2), (3), (4) are derived by differentiating Equation (1).

$$dy/dx = 30 \cdot (x4 - 2 \cdot x^3 + x^2) \tag{2}$$

$$d2y/dx2 = 60 \cdot (2 \cdot x^3 - 3 \cdot x^2 + x) \tag{3}$$

$$d^3y/dx^3 = 60 \cdot (6 \cdot x^2 - 6 \cdot x + 1) \tag{4}$$

If the value of x when $d^3y/dx^3=0$ is reverse calculated by Equation (4) above, then Equation (5) below is obtained.

$$x(d^3y/dx^3=0)=(3\pm 3^{1/2})/6 \quad (5)$$

From this value of x, $d^2y/dx^2$ is calculated by Equation (3), and if this value is taken to be the absolute value of the maximum lateral acceleration $|(d^2y/dx^2)max|$, then the value in (6) below is obtained.

$$|(d^2y/dx^2)max|=10.3^{1/2}/3\cong 5.77 \quad (6)$$

Furthermore, when the maximum lateral acceleration upon lane changing $(d^2Y/dt^2)max\_c$ (a previously set value) is represented with the maximum value $(d^2y/dx^2)max$ of the lateral acceleration described above, the following equation (7) is obtained, taking the travel distance required to lane changing as L, and taking the lane changing width as W.

$$(d^2y/dx^2)max\cdot W/(L/V)^2=(d^2Y/dt^2)max\_c \quad (7)$$

If Equation (7) is resolved for the travel distance L, then Equation (8) below is obtained.

$$L=(5.77\cdot W\cdot V^2/(d^2Y/dt^2)max\_c)^{1/2} \quad (8)$$

From this Equation (8), the distance L1 required for the P1 is resolved in Equation (9) below, taking the vehicle velocity V in this case to be V1.

$$L1=(5.77\cdot W\cdot V1^2/(d^2Y/dt^2)max\_c)^{1/2} \quad (9)$$

Furthermore, when the estimated value of the normalized travel distance of the subject vehicle in the x direction is taken to be xe, then $$xe=(\int V\cdot dt)/L \quad (10).$$

The relationship between the target yaw rate γt, the vehicle velocity V and the lateral acceleration $(d^2y/dx^2)$ is expressed in Equation (11) below, and therefore the target yaw rate γt is given by Equation (12) below, using Equation (3) described above.

$$γt\cdot V=(d^2y/dx^2)\cdot W/(L/V)^2 \quad (11)$$

$$γt=60\cdot (2\cdot xe^3-3\cdot xe^2+xe)\cdot W\cdot V/L^2 \quad (12)$$

By substituting this target yaw rate γt into the relationship (Equation (13)) for the target steering wheel angle θHt indicated below, the target steering wheel angle θHt required for control (as output to the steering control device 23) is obtained.

$$θHt=γt\cdot n/Gγ \quad (13)$$

Here, n is the steering gear ratio, Gγ is the yaw rate gain, and this yaw rate gain Gγ can be calculated by Equation (14) below, for example.

$$Gγ=(1/(1+A\cdot V^2))\cdot (V/l) \quad (14)$$

Here, A is the stability factor which is unique to the vehicle, and l is the wheelbase.

In this way, in the phase P1 in S101, the target steering wheel angle θHt is calculated by Equation (13) described above, automatic steering control is applied, and the vehicle travels the distance L1 indicated in Equation (9) described above. The values V1 and L1 are used respectively for the vehicle velocity V and distance L that are required in order to calculate the target steering wheel angle θHt.

In the example, the vehicle trajectory when the subject vehicle performs lane changing is determined by a normalized polynomial expression for a minimum-jerk trajectory, but the invention is not limited to this and the trajectory may be approximated by another curve function, or the like.

When the phase P1 in S101 has ended and lane changing has been completed, the phase P2 illustrated in FIG. 7 is implemented in S102. While the travel control unit 10 is implementing the phase P2, a flag Fp2 that indicates that first acceleration is under progress is set (Fp2=1).

This phase P2 is travel control for accelerating in the passing lane until the subject vehicle catches up with and travels substantially parallel with the vehicle to be passed, and the travel distance L2 in the phase P2 can be calculated, for example, by Equation (15) below.

$$L2=(1/2\cdot (d^2X/dt^2)t)\cdot (V2^2-V1^2) \quad (15)$$

Here, V2 is the target vehicle velocity after the acceleration for passing and is, for example, either one of the following values, whichever is smaller: the velocity Vf of the vehicle to be passed plus a predetermined velocity (in other words, a (target) relative velocity when passing) ΔV, namely, (Vf+ΔV); and a limit velocity Vlim (a predetermined velocity limit or the velocity limit for the road as recognized by the various input signals indicated above).

$(d^2X/dt^2)t$ is the target acceleration for passing and is set, for example, by Equation (16) below.

$$(d^2X/dt^2)t=min((d^2X/dt^2)0-Kg\cdot Ug,μe\cdot g) \quad (16)$$

Here, min is a minimum function that selects $((d^2X/dt^2)0-Kg\cdot Ug)$ or $(μe\cdot g)$, whichever is smaller, $(d^2X/dt^2)0$ is a predetermined reference value for the acceleration for passing, Kg is the road surface gradient coefficient, and g is the acceleration due to gravity.

When the phase P2 is ended in S102, the travel control unit 10 advances to S103 where the phase P3 illustrated in FIG. 7 is implemented. While the travel control unit 10 is implementing the phase P3, a flag Fp3 that indicates that second acceleration is under progress is set (Fp3=1).

This phase P3 is travel control for accelerating in order for the vehicle to return to the original lane after traveling in the passing lane substantially parallel with the vehicle to be passed, and the travel distance L3 in the phase P3 can be calculated, for example, by Equation (17) below.

$$L3=(Lp-(1/(2\cdot (d^2X/dt^2)t))\cdot (V2-V1)^2)\cdot V2/(V2-V1) \quad (17)$$

Here, Lp is a value obtained by adding a target vehicle-to-vehicle distance after passing, to the vehicle-to-vehicle distance between the subject vehicle and the vehicle to be passed.

When the phase P3 is ended in S103, the travel control unit 10 advances to S104 where the phase P4 illustrated in FIG. 7 is implemented. When the travel control unit 10 implements the phase P4, a flag Fp4 that indicates that lane changing is under progress to return to the original lane is set (Fp4=1).

This phase P4 involves control that is implemented until the subject vehicle has passed the vehicle to be passed in the passing lane and has returned to the original lane. Therefore, when the travel distance L4 in this phase P4 is obtained by a normalized polynomial expression for a minimum-jerk trajectory, for example, the travel distance L4 is calculated by Equation (18) below, from Equation (8) described above.

$$L4=(5.77\cdot W\cdot V2^2/(d^2Y/dt^2)max\_c)^{1/2} \quad (18)$$

The target steering wheel angle θHt required for control (as output to the steering control device 23) is calculated by using V4 and L4 respectively for the vehicle velocity V and distance L, on the basis of Equation (13) described above. Consequently, the travel distance Lr based on passing control implemented by the travel control unit 10 according to the example is L1+L2+L3+L4.

Then, the travel control unit 10 monitors the vehicle to be passed and the parallel traveling vehicle. In either one of the cases where control for passing the vehicle to be passed has started (in the case of the phase P1), and where lane changing has been performed (in the case of the phase P2), the travel control unit 10 implements control for suspending a passing maneuver, when at least either one of the following situations is detected: the position of a parallel traveling vehicle is predicted to be within a predetermined range from the subject vehicle; and the parallel traveling vehicle intends to perform lane changing to the passing lane to which the subject vehicle performs lane changing in order to pass the vehicle to be passed.

Figure 3:
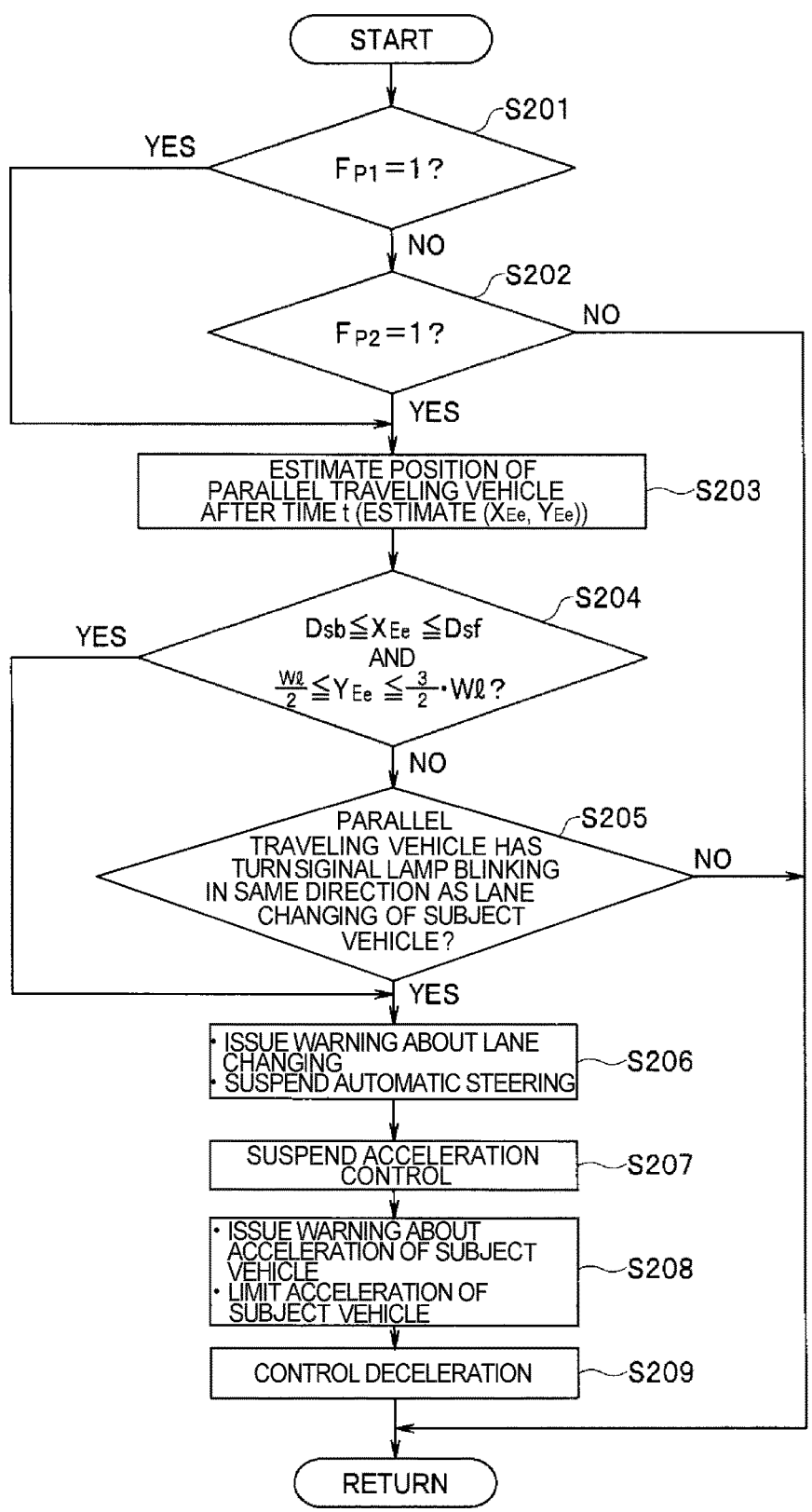
FIG. 3 is a flowchart of travel control during monitoring of a parallel traveling vehicle, in the lane changing for passing start and first-stage acceleration according to the example.
Figure 8:
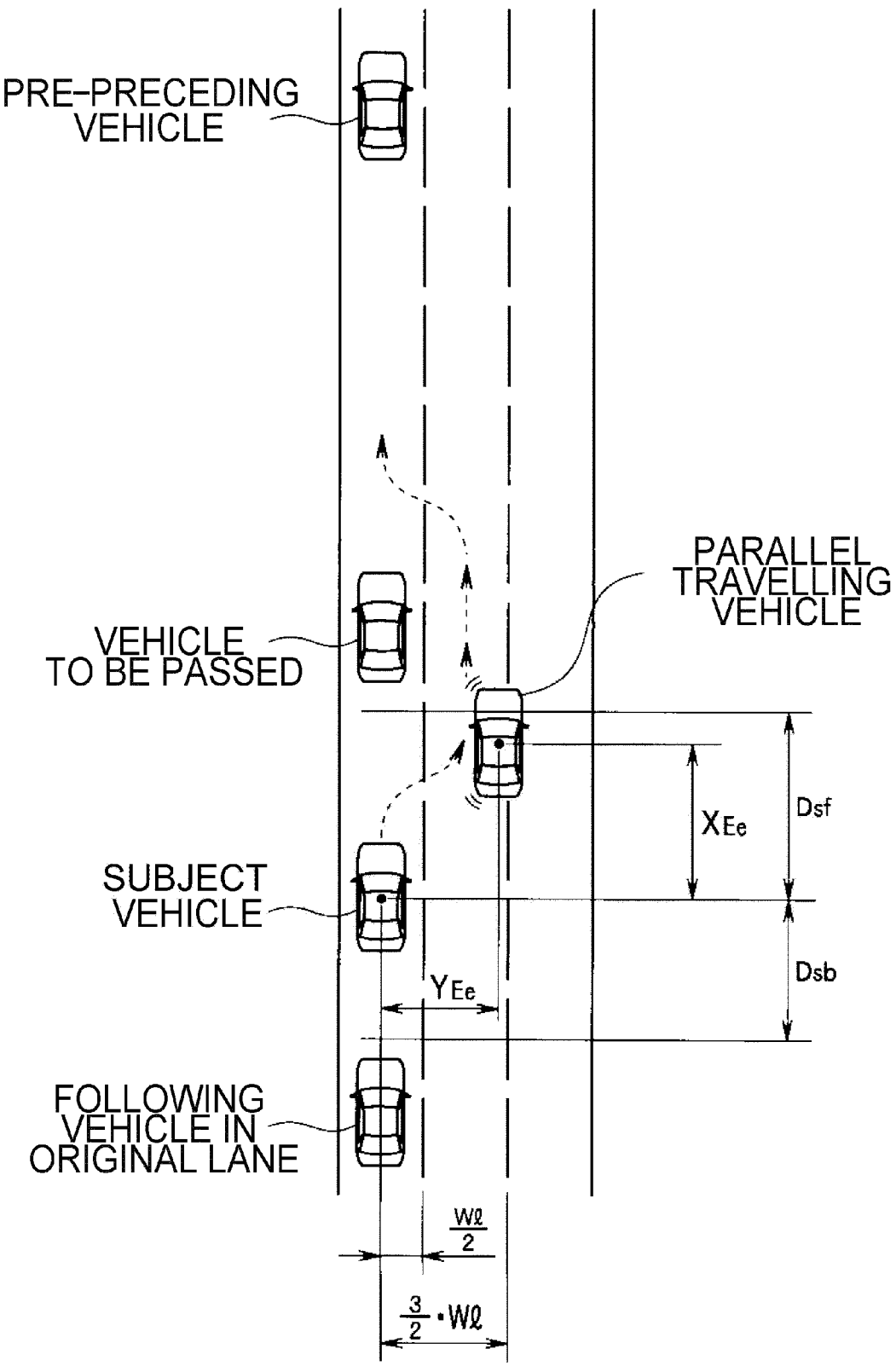
FIG. 8 is an illustrative diagram of travel control during monitoring of a parallel traveling vehicle in the lane changing for passing start and first-stage acceleration in FIG. 3 according to the example.

The travel control during monitoring of the following vehicle in the original lane, in the lane changing for passing start and the first-stage acceleration which are respectively performed in the phase P1 and the phase P2, are described here with reference to the flowchart illustrated in FIG. 3 and to FIG. 8.

Firstly, in S201, it is determined whether or not the phase P1 is in progress (whether or not Fp1=1). If the P1 is determined to be in progress (Fp1=1), the travel control unit 10 jumps to S203, whereas if the phase P1 is determined not to be in progress (Fp1=0), the travel control unit 10 advances to S202 where it is determined whether or not the phase P2 is in progress (whether or not Fp2=1).

If the phase P2 is determined to be in progress (Fp2=1), the travel control unit 10 advances to S203. If the phase P2 is determined not to be in progress (Fp2=0; in other words, neither the phase P1 nor the phase P2 is in progress), the travel control unit 10 exits the routine.

When it is determined that the phase P1 or the phase P2 is in progress and the travel control unit advances to S203, the position (XEe, YEe) of the parallel traveling vehicle after time t is estimated by Equation (19) and Equation (20) below, for instance.

$$XEe = XE0 - VRx\_E \cdot t - (1/2) \cdot (dVRx\_E/dt) \cdot t^2 \quad (19)$$

$$YEe = YE0 - VRy\_E \cdot t - (1/2) \cdot (dVRy\_E/dt) \cdot t^2 \quad (20)$$

Here, the relative velocity is (VRx_E, VRx_E) when the current relative position of the parallel traveling vehicle from the subject vehicle is (XE0, YE0), and these values are determined by the peripheral environment recognition device 11, or the like. Furthermore, time t is a time set previously by experimentation, calculation, or the like.

Next, the travel control unit 10 advances to S204 to determine whether or not the position (XEe, YEe) of the parallel traveling vehicle after time t is near the lane changing destination of the subject vehicle in order to pass the vehicle to be passed, or is within a predetermined distance in front of the subject vehicle.

More specifically, as shown in FIG. 8, it is determined whether or not the parallel traveling vehicle is estimated to be in a region of Dsb≤XEe≤Dsf and (1/2)·W1≤YEe≤(3/2)·W1. Here, Dsf is a threshold value which defines a position in front of the subject vehicle, Dsb is a threshold value that defines a position behind the subject vehicle, and these threshold values Dsb and Dsf are set in advance by experimentation, calculation, or the like. W1 is the lane width. Therefore, this region is the region of the lane changing destination of the subject vehicle in order to pass the vehicle to be passed.

If it is determined in S204 that the parallel traveling vehicle will be located in the region of the lane changing destination of the subject vehicle in order to pass the vehicle to be passed after time t, the travel control unit 10 jumps to S206. If, conversely, it is not determined that the parallel traveling vehicle will be located in the region of the lane changing destination of the subject vehicle in order to pass the vehicle to be passed after time t, the travel control unit 10 jumps to S205.

In S205, it is determined whether or not the parallel traveling vehicle has a turn-signal lamp blinking in the same direction as the lane changing by the subject vehicle. If it is not determined the parallel traveling vehicle has a turn-signal lamp blinking in the same direction as the lane changing of the subject vehicle, the travel control unit 10 exits the routine without any change, and the travel control program illustrated in FIG. 2 is continued.

If it is determined that the parallel traveling vehicle has a turn-signal lamp blinking in the same direction as the lane changing of the subject vehicle, the travel control unit 10 advances to S206.

When advancing to S206 from S204 or S205, a visual warning is issued with a display panel, monitor or alarm lamp of the display device 24, or an audible warning is issued with the speaker/buzzer 25, or a notification is issued by causing the steering wheel to vibrate by the steering control device 23, in order to notify the driver that the parallel traveling vehicle is seeking to enter the passing lane. Furthermore, if the steering control device 23 has a lane keeping control function, lane keeping control is implemented so as to keep the vehicle traveling along the traveling lane (so as not to perform lane changing by passing control). Moreover, the automatic steering (lane changing) that is seeking to perform passing control is suspended.

Then, the travel control unit 10 advances to S207 to and suspend the acceleration control which has been set for the purpose of passing maneuver control. More specifically, the target acceleration is set compulsorily to zero.

Figure 12:
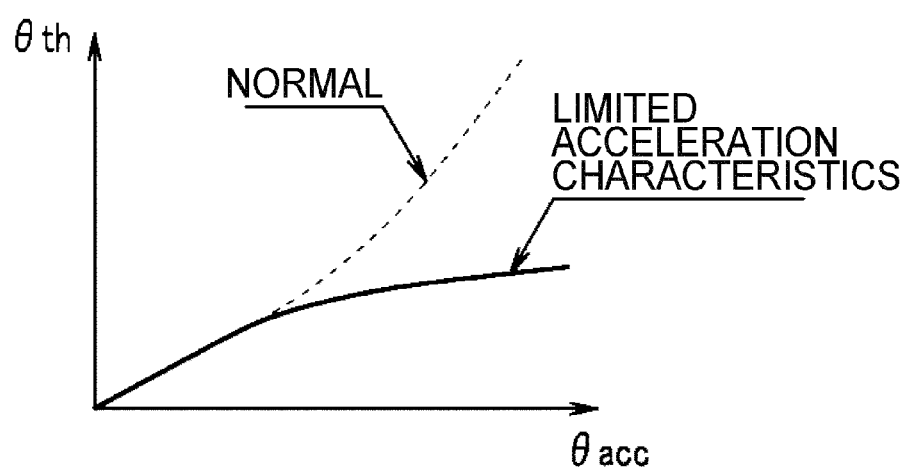
FIG. 12 is a diagram illustrating an exemplary throttle opening degree with respect to an accelerator opening degree in which the acceleration characteristics are limited, according to the example.

Then, the travel control unit 10 proceeds to S208 to issue a visual warning with the display panel, monitor or alarm lamp of the display device 24, or an audible warning with the speaker/buzzer 25, so as to notify the driver with regard to the acceleration of the subject vehicle for lane changing. A characteristics map of the accelerator opening degree θacc/throttle opening degree θth in which the accelerator characteristics are limited to a greater extent compared to normal driving is set in the engine control device 21, as illustrated in FIG. 12, for example.

Then the travel control unit 10 advances to S209 to output a signal to the brake control device 22 to, for example, generate automatic braking so as to achieve a predetermined rate of deceleration. In addition, a stop lamp (not illustrated) is caused to light up.

In the example, after issuing a warning about lane changing in S206, automatic steering is suspended, the acceleration control is suspended in S207, a warning about the acceleration of the subject vehicle is issued in S208, the acceleration of the subject vehicle is limited, and deceleration control is implemented in S209. Alternatively, any one or any combination of these processes may be used.

In the example, the travel control unit 10 monitors the vehicle to be passed and the following vehicle in the original lane. When the subject vehicle performs lane changing in order to pass the vehicle to be passed and is in the phase P2 or phase P3, and the acceleration control relative to the vehicle to be passed is suspended, if the following vehicle in the original lane passes the subject vehicle and a predetermined distance can be ensured between the subject vehicle and the following vehicle in the original lane, behind the following vehicle in the original lane, the subject vehicle is allowed to return to the original lane behind the following vehicle in the original lane. Furthermore, when the following vehicle in the original lane is behind the subject vehicle by more than a predetermined distance and has a relative speed with respect to the subject vehicle that indicates that the subject vehicle and the following vehicle in the original lane are becoming distant from each other, the subject vehicle is allowed to return to the original lane in front of the following vehicle in the original lane.

Figure 4:
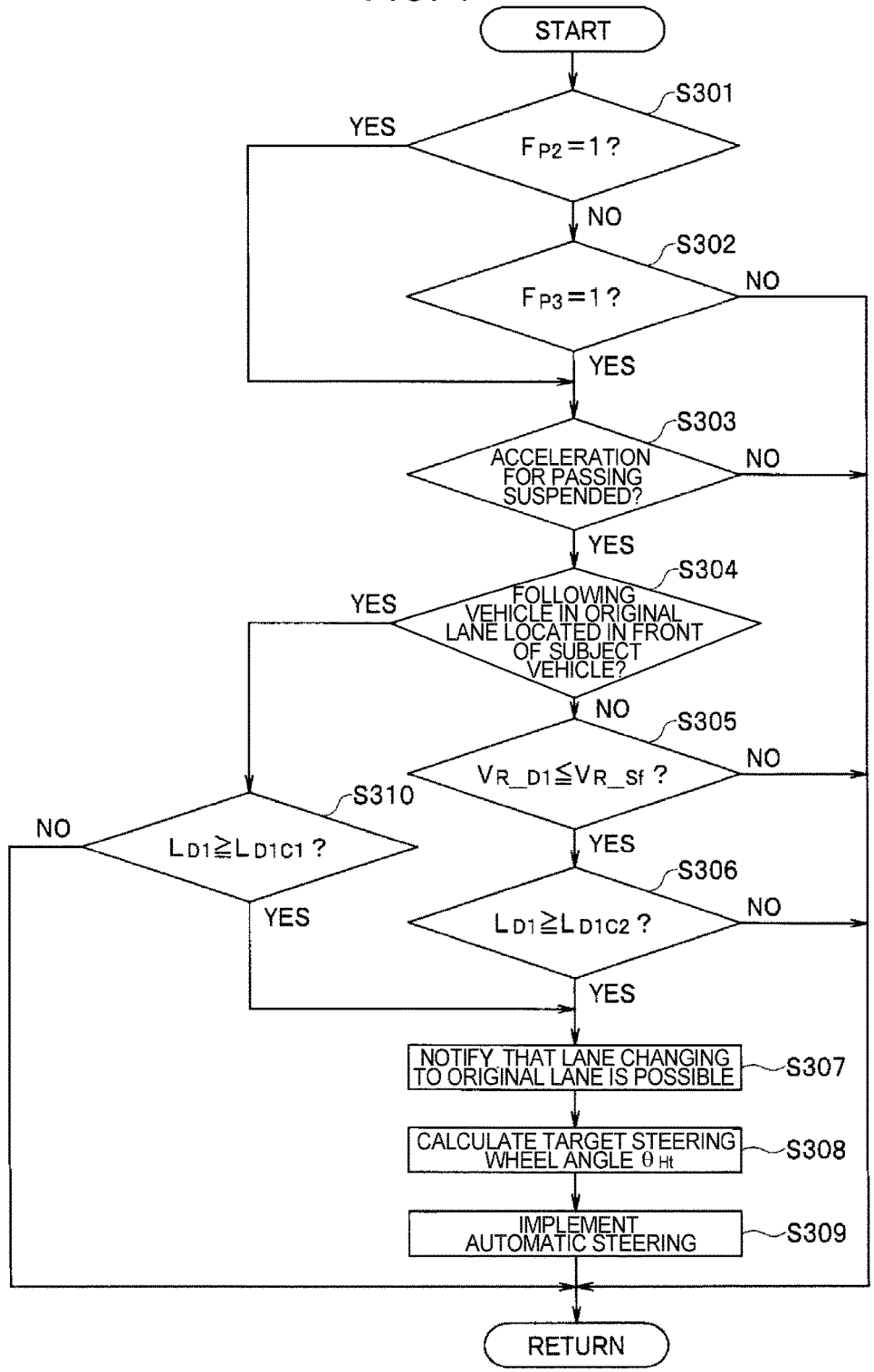
FIG. 4 is a flowchart of travel control during monitoring of a following vehicle in the original lane, in the first-stage acceleration and second-stage acceleration according to the example.

The travel control during monitoring of the following vehicle in the original lane, in the first-stage and second-stage accelerations which are respectively performed in the phase P2 and the phase P3, will be described with reference to the flowchart in FIG. 4 and to FIGS. 9A and 9B.

Firstly, in S301, it is determined whether or not the phase P2 is in progress (whether or not Fp2=1). If the phase P2 is determined to be in progress (Fp2=1), the travel control unit 10 jumps to S303. If the phase P2 is not in progress (Fp2=0), the travel control unit 10 advances to S302 where it is determined whether or not the phase P3 is in progress (whether or not Fp3=1).

If the phase P3 determined to be is in progress (Fp3=1), the travel control unit 10 advances to S303. If the phase P3 is not in progress (Fp3=0; in other words, neither the phase P2 nor the phase P3 is in progress), the travel control unit 10 exits the routine.

When the phase P2 is determined to be in progress or the phase P3 is determined to be in progress, and then the travel control unit 10 advances to S303, it is determined whether or not acceleration for passing has been suspended. If the acceleration has not been suspended, the travel control unit 10 exits the routine. If the acceleration for passing has been suspended, the travel control unit 10 proceeds to S304.

When it is determined in S303 that the acceleration for passing has been suspended and the travel control unit 10 advances to S304, it is determined whether or not the following vehicle in the original lane is located in front of the subject vehicle.

If the following vehicle in the original lane is determined not to be located in front of the subject vehicle, the travel control unit 10 advances to S305 to determine whether or not the following vehicle in the original lane has not passed the subject vehicle but rather is behind the subject vehicle, and a vehicle-to-vehicle distance between the subject vehicle and the following vehicle in the original lane is becoming longer. In other words, it is determined whether or not VR_D1≤VR_sf, where VR_sf is a predetermined moving-apart determination value of the relative speed with respect to the subject vehicle.

If VR_D1≤VR_sf, that is, it is determined in S305 that the following vehicle in the original lane has not passed the subject vehicle, but rather is behind the subject vehicle and the vehicle-to-vehicle distance between the subject vehicle and the following vehicle in the original lane is becoming longer, the travel control unit 10 advances to S306. If, conversely, VR_D1>VR_sf, that is, it is determined that there is a possibility of the following vehicle in the original lane passing the subject vehicle, the travel control unit 10 exits the routine without any change.

When it is VR_D1≤VR_sf determined in S305 and the travel control unit 10 advances to S306, it is determined whether or not the vehicle-to-vehicle distance LD1 between the subject vehicle and the following vehicle in the original lane is equal to or longer than a distance LD1c2 that is long enough for the subject vehicle to return to the original lane (whether LD1≥LD1c2). If LD1≥LD1c2, the travel control unit 10 advances to S307. Conversely, if LD1<LD1c2, that is, it is determined that there is not sufficient vehicle-to-vehicle distance (LD1c2) for the subject vehicle to return, the travel control unit 10 exits the routine directly without any change.

Figures 9A, 9B:
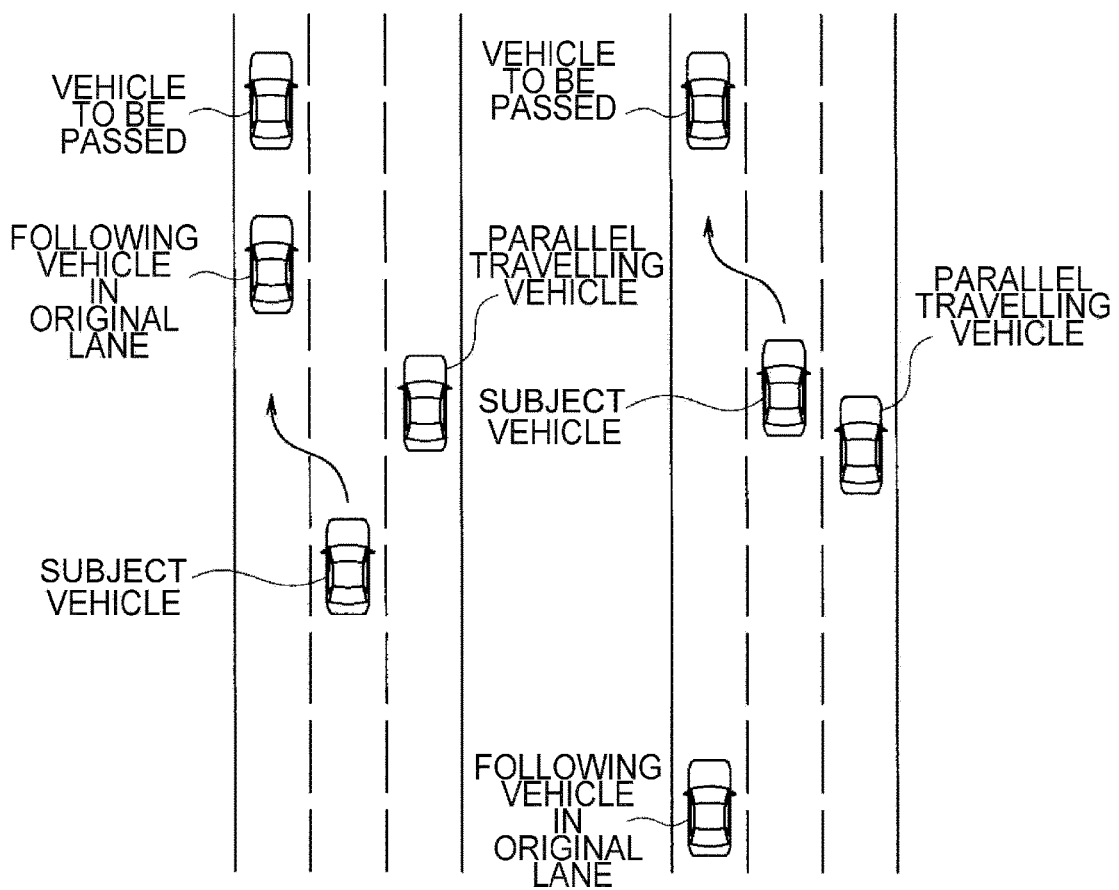

If it is determined in S306 that there is sufficient vehicle-to-vehicle distance (LD1c2) for the subject vehicle to return to the original lane and the travel control unit 10 advances to S307, a visual warning is issued with the display panel, monitor or alarm lamps of the display device 24, or an audible warning is issued with the speaker/buzzer 25, in order to notify the driver that the subject vehicle can return to the original lane along a travel trajectory such as that illustrated in FIG. 9B.

Then, the travel control unit 10 advances to S308 where the target steering wheel angle θHt is calculated on the basis of the current vehicle velocity, etc., using, for example, Equation (13) described above.

Then, the travel control unit 10 advances to S309 to output the target steering wheel angle θHt to the steering control device 23, and exits the routine.

On the other hand, when it is determined in S304 that the following vehicle in the original lane is located in front of the subject vehicle, the travel control unit 10 advances to S310 where it is determined whether or not the vehicle-to-vehicle distance LD1 between the subject vehicle and the following vehicle in the original lane is equal to or longer than a distance LD1c1 that is enough for the subject vehicle to return to the original lane (whether LD1≥LD1c1). If LD1≥LD1c1, the travel control unit 10 advances to S307. Conversely, if LD1<LD1c1, that is, it is determined that there is not sufficient vehicle-to-vehicle distance (LD1c1) for the subject vehicle to return to the original lane, the travel control unit 10 exits this routine without any change.

If it is determined in S310 that there is sufficient vehicle-to-vehicle distance (LD1c1) for the subject vehicle to return to the original lane and the travel control unit 10 advances to S307, a visual warning is issued with the display panel, monitor or alarm lamps of the display device 24, or an audible warning is issued with the speaker/buzzer 25, in order to notify the driver that the subject vehicle can return to the original lane along a travel trajectory such as that illustrated in FIG. 9A.

Then, the travel control unit 10 advances to S308 where the target steering wheel angle θHt is calculated on the basis of the current vehicle velocity, etc, using, for example, Equation (13) described above.

Then, the travel control unit 10 advances to S309 to output the target steering wheel angle θHt to the steering control device 23, and exits the routine.

In the example, after reporting that lane changing back to the original lane is possible in S307, the target steering wheel angle θHt is calculated in S308, and automatic steering is performed in S309. Alternatively, any one or any combination of these processes may be performed.

The travel control unit 10 monitors the vehicle to be passed and the parallel traveling vehicle. In the case where the subject vehicle has performed lane changing in order to pass the vehicle to be passed, and the phase P2 or the phase P3 is in progress, the travel control unit 10 implements control for suspending a passing maneuver, when at least either one of the following situations is detected: the position of a parallel traveling vehicle is predicted to be within a predetermined range in the passing lane in which the subject vehicle is traveling; and the parallel traveling vehicle intends to perform lane changing to the passing lane.

Figure 5:
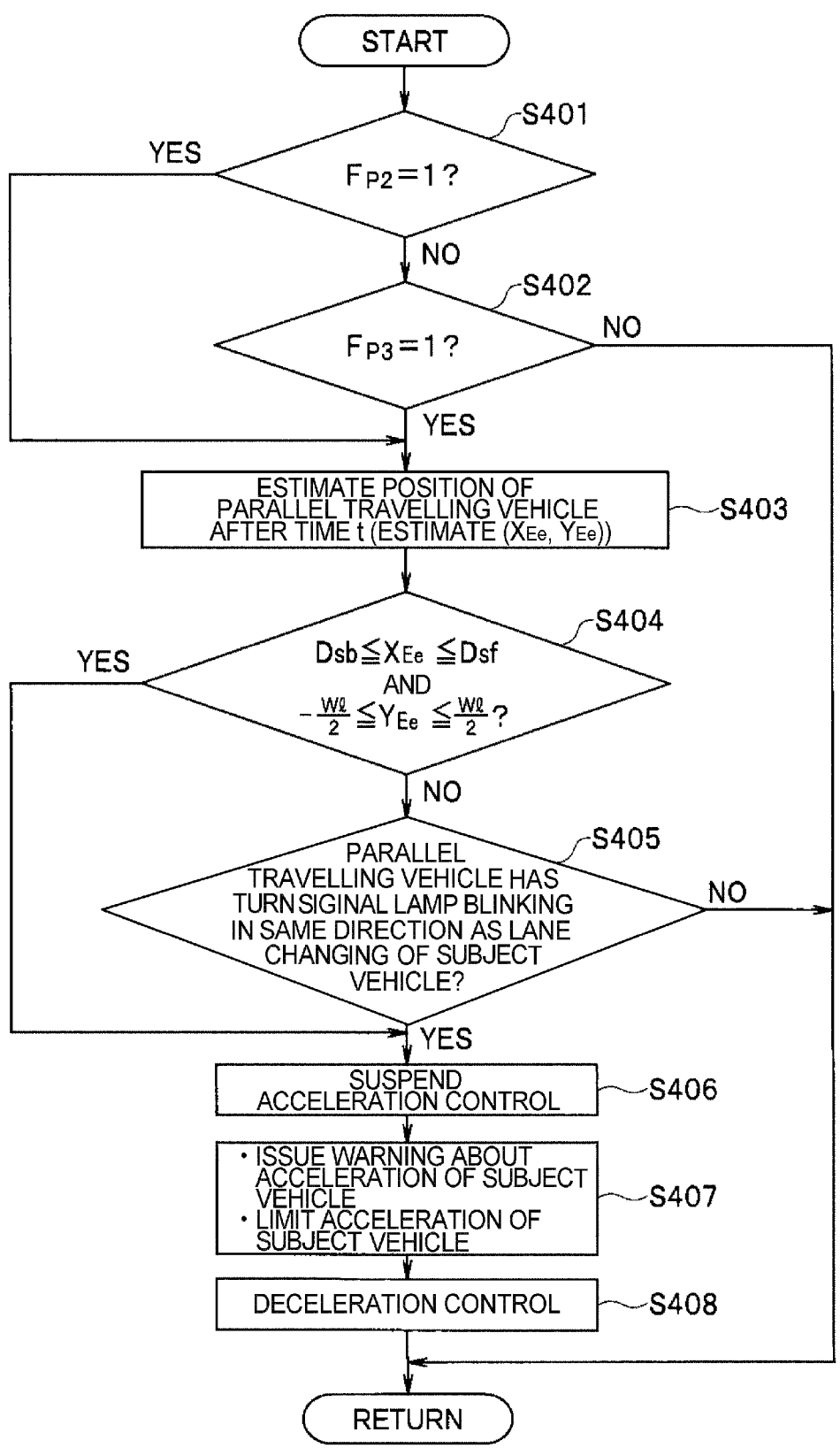
FIG. 5 is a flowchart of travel control during monitoring of a parallel traveling vehicle, in the first-stage and second-stage accelerations according to the example.

The travel control during monitoring of the parallel traveling vehicle in the first-stage and second-stage passing accelerations, which are respectively performed in the phase P2 or the phase P3, will be described with reference to the flowchart in FIG. 5 and to FIG. 10.

Firstly, in S401, it is determined whether or not the phase P2 is in progress (whether or not Fp2=1). If, the phase P2 is determined to be in progress (Fp2=1), the travel control unit 10 jumps to S403, whereas if the phase P2 is determined not to be in progress (Fp2=0), the travel control unit 10 advances to S402 where it is determined whether or not the phase P3 is in progress (whether or not Fp3=1).

If the phase P3 is determined to be in progress (Fp3=1), the travel control unit 10 advances to S403. If the phase P3 is determined not to be in progress (Fp3=0; in other words, neither the phase P2 nor the phase P3 is in progress), the travel control unit 10 exits the routine.

When the travel control unit 10 advances to S403 if either the phase P2 or the phase P3 is in progress, the position (XEe, YEe) of the parallel traveling vehicle after time t is estimated by Equation (19) and Equation (20) above, for instance.

Next, the travel control unit 10 advances to S404 to determine whether or not the position (XEe, YEe) of the parallel traveling vehicle after time t is in a predetermined range of the passing lane being traveled by the subject vehicle. More specifically, as illustrated in FIG. 10, it is determined whether or not the parallel traveling vehicle is estimated to be in the region of $Dsb \leq XEe \leq Dsf$ and $-(\frac{1}{2}) \cdot W1 \leq YEe \leq (\frac{1}{2}) \cdot W1$.

If it is determined in S404 that the parallel traveling vehicle after time t will be located within a predetermined range of the passing lane being travelled by the subject vehicle, the travel control unit 10 jumps to S406. If, conversely, it is not determined that the parallel traveling vehicle will be located within the predetermined range of the passing lane being travelled by the subject vehicle after time t, the travel control unit 10 jumps to S405.

In S405, it is determined whether or not the parallel traveling vehicle has a turn-signal lamp blinking in the same direction as the lane changing by the subject vehicle. If it is not determined the turn-signal lamp of the parallel traveling vehicle is blinking in the same direction as the lane changing by the subject vehicle, the travel control unit 10 exits the routine without any change. If it is determined that the turn-signal lamp of the parallel traveling vehicle is blinking in the same direction as the lane changing of the subject vehicle, the travel control unit 10 advances to S406. FIG. 10 exemplifies a case where both of the conditions in S404 and S405 are established.

When advancing to S406 from S404 or S405, the travel control unit 10 suspends the acceleration control which has been set for the purpose of passing maneuver control. More specifically, the target acceleration is set compulsorily to zero.

Then, the travel control unit 10 proceeds to S407 to issue a visual warning with the display panel, monitor or alarm lamp of the display device 24, or an audible warning with the speaker/buzzer 25, so as to notify the driver with regard to the acceleration of the subject vehicle for lane changing. A characteristics map of the accelerator opening degree θacc/throttle opening degree θth in which the accelerator characteristics are limited to a greater extent compared to normal driving is set in the engine control device 21, as illustrated in FIG. 12, for example.

Thereupon the travel control unit 10 advances to S408 to output a signal to the brake control device 22 to, for example, generate automatic braking so as to achieve a predetermined rate of deceleration. In addition, the stop lamp (not illustrated) is caused to light.

In the example, the acceleration control is suspended in S406, a warning about the acceleration of the subject vehicle is issued in S407, the acceleration of the subject vehicle is limited, and deceleration control is performed in S408. Alternatively, it is possible to use any one or any combination of these processes may be used.

In the example, the travel control unit 10 monitors the vehicle to be passed and the parallel traveling vehicle. If the subject vehicle performs lane changing in order to pass the vehicle to be passed and the phase P2 or the phase P3 is in progress, and if a parallel traveling vehicle is present in front of the subject vehicle when the subject vehicle performs lane changing in order to pass the vehicle to be passed, and a predetermined space is detected in the lane where the parallel traveling vehicle was originally present, the subject vehicle is allowed to perform lane changing to this space.

Figure 6:
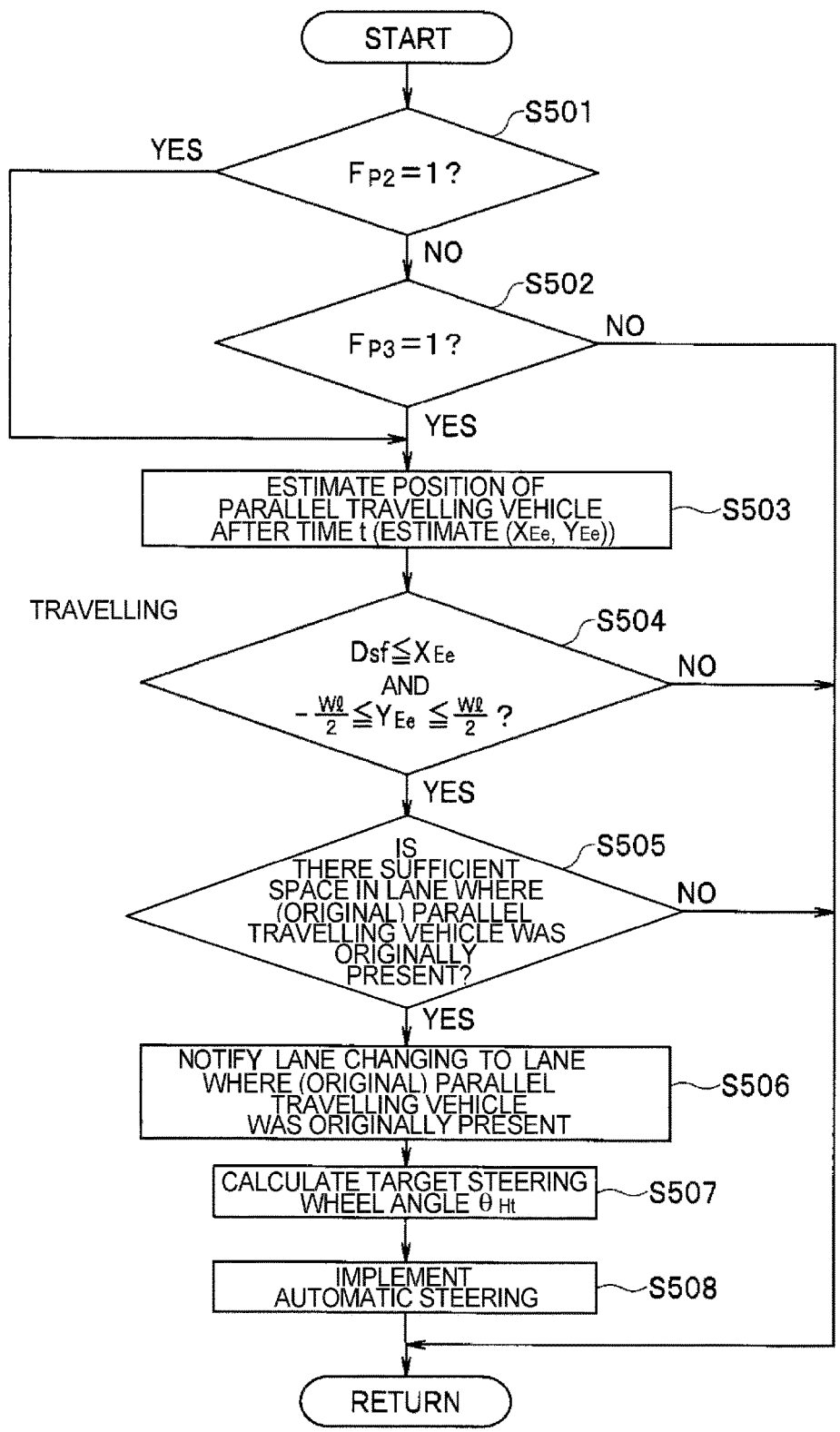
FIG. 6 is a flowchart of travel control during monitoring of the parallel traveling vehicle and another parallel traveling vehicle, in the first-stage and second-stage accelerations according to the example.
Figure 11:
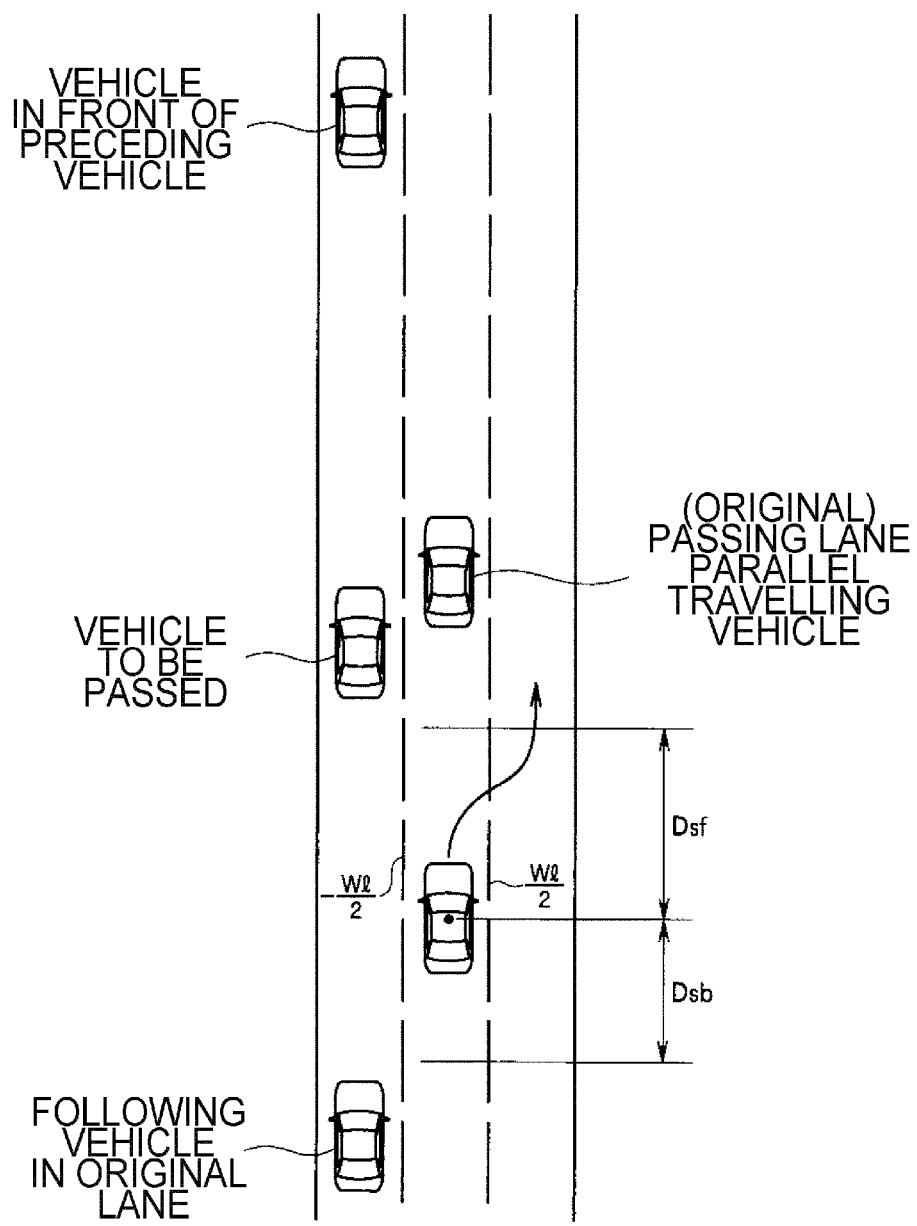
FIG. 11 is an illustrative diagram of travel control during monitoring of the parallel traveling vehicle and the another parallel traveling vehicle, in the first-stage and second-stage accelerations in FIG. 6 according to the example.

Hereinafter, the travel control during monitoring of the parallel traveling vehicle in the first-stage and second-stage passing accelerations, which are respectively performed in the phase P2 and the phase P3, will be described with reference to the flowchart illustrated in FIG. 6 and to FIG. 11.

Firstly, in S501, it is determined whether or not the phase P2 is in progress (whether or not Fp2=1). If the phase P2 is determined to be in progress (Fp2=1), the travel control unit 10 jumps to S503. If the phase P2 is not in progress (Fp2=0), the travel control unit 10 advances to S502 where it is determined whether or not the phase P3 is in progress (whether or not Fp3=1).

If the P3 is determined to be in progress (Fp3=1), the travel control unit 10 advances to S503. If the phase P3 is not in progress (Fp3=0; in other words, neither the phase P2 nor the phase P3 is in progress), the travel control unit 10 exits the routine.

When either the phase P2 or the phase P3 is in progress and thus the travel control unit 10 advances to S503, the position (XEe, YEe) of the parallel traveling vehicle after time t is estimated by Equation (19) and Equation (20) above, for instance.

Then, the travel control unit 10 advances to S504 determine whether or not it is estimated that the position (XEe, YEe) of the parallel traveling vehicle after time t will be in a predetermined range in front in the passing lane being travelled by the subject vehicle. More specifically, it is determined whether or not the parallel traveling vehicle is estimated to be in the region of $Dsf < XEe$ and $-(\frac{1}{2}) \cdot W1 \leq YEe \leq (\frac{1}{2}) \cdot W1$ (see FIG. 11).

If the parallel traveling vehicle is determined not to be in the abovementioned region, the travel control unit 10 exits the routine. If the parallel traveling vehicle is determined to be in the region, the travel control unit 10 advances to S505.

Upon advancing to S505, it is determined whether or not there is no other parallel travel vehicle, or the like, in the lane where the parallel traveling vehicle was originally present, and whether or not there is sufficient space for the subject vehicle to perform lane changing.

If, it is determined in S505 that there is not sufficient space for the subject vehicle to perform lane changing, the travel control unit 10 exits the routine. If it is determined that there is sufficient space, the travel control unit 10 advances to S506.

Upon advancing to S506, a visual notification is issued with the display panel, monitor or alarm lamps of the display device 24, or an audible notification is issued with the speaker/buzzer 25, to notify the driver that the subject vehicle can return to the lane where the (original) parallel traveling vehicle was originally present.

Then, the travel control unit 10 advances to S507 where the target steering wheel angle θHt is calculated on the basis of the current vehicle velocity, etc, using, for example, Equation (13) described above.

Then, the travel control unit 10 advances to S508 to output the target steering wheel angle θHt to the steering control device 23, and exits the routine.

In the example, after notifying in S506 that the subject vehicle can return to the lane where the (original) parallel traveling vehicle was originally present, the target steering wheel angle θHt is calculated in S507, and automatic steering is performed in S508. Alternatively, any one or any combination of these processes may be performed.

As described above, the travel control unit 10 is provided with the functions of the peripheral environment recognition unit, the vehicle to be passed detection unit, the parallel traveling vehicle detection unit, a following vehicle in original lane detection unit and the passing control unit of the appended claims in the example.

According to the example, a vehicle to be passed that is a target of passing and is in front of the subject vehicle in the traveling lane thereof is detected on the basis of the peripheral environment information and travel information, a parallel traveling vehicle that is traveling in a lane that is adjacent to a lane to which the subject vehicle performs lane changing to pass the vehicle to be passed and is located on the opposite side of the lane in which the vehicle to be passed is traveling is detected on the basis of the peripheral environment information, the vehicle to be passed and the parallel traveling vehicle are monitored, and a passing maneuver with respect to the vehicle to be passed is controlled variably on the basis of the monitoring result. More specifically, in either one of the cases where control for passing the vehicle to be passed has started (in the case of the phase P1), and where lane changing has been performed (in the case of the phase P2), control to suspend the passing maneuver is implemented if at least either one of the following situations is detected: the position of a parallel traveling vehicle is predicted to be within a predetermined range from the subject vehicle; and the parallel traveling vehicle intends to perform lane changing to the passing lane to which the subject vehicle changes lanes in order to pass the vehicle to be passed. Furthermore, the vehicle to be passed and the parallel traveling vehicle are monitored, and in the case the subject vehicle has performed lane changing in order to pass the vehicle to be passed, and the phase P2 or the phase P3 is in progress, control to suspend the passing maneuver is implemented, if at least either one of the following situations is detected: the position of a parallel traveling vehicle is predicted to be within a predetermined range from the passing lane in which the subject vehicle is traveling; and the parallel traveling vehicle intends to perform lane changing to the passing lane. Moreover, the vehicle to be passed and the parallel traveling vehicle are monitored, and in the case the subject vehicle has performed lane changing in order to pass the vehicle to be passed and the phase P2 or the phase P3 is in progress, and if a parallel traveling vehicle is present in front of the subject vehicle when the subject vehicle performs lane changing in order to pass the vehicle to be passed, and a predetermined space is detected in the lane where the parallel traveling vehicle was originally present, then the subject vehicle is allowed to perform lane changing to this space. Furthermore, a following vehicle behind the subject vehicle in the traveling lane thereof is detected as a following vehicle in the original lane, on the basis of the peripheral environment information, and if the subject vehicle performs lane changing in order to pass the vehicle to be passed and is in the phase P2 or phase P3, and if the acceleration control relative to the vehicle to be passed is suspended, then when the following vehicle in the original lane passes the subject vehicle and a predetermined distance can be ensured between the subject vehicle and the following vehicle in the original lane, behind the following vehicle in the original lane, the subject vehicle is allowed to return to the original lane behind the following vehicle in the original lane, and furthermore, when the following vehicle in the original lane is behind the subject vehicle by more than a predetermined distance and has a relative speed with respect to the subject vehicle that indicates that the subject vehicle and the following vehicle in the original lane are becoming distant from each other, the subject vehicle is allowed to return to the original lane in front of the following vehicle in the original lane. Therefore, when implementing passing control using automatic driving technology, if it is desirable not to implement an actual passing maneuver, or if it is desirable to return to the original lane without passing the preceding vehicle, even after lane changing in order to implement passing, for instance, due to the traveling state of following vehicles or a parallel traveling vehicle that is traveling in the lane that is adjacent to the lane to which the subject vehicle performs lane changing to pass the vehicle to be passed and is located on the opposite side of the lane in which the vehicle to be passed is traveling, this information is gathered appropriately and notified to the driver, or lane changing back to the original lane or the like can be performed automatically.

The invention claimed is:

1. A travel control apparatus for a vehicle, comprising:
a peripheral environment recognition unit that recognizes peripheral environment information on peripheral environment including a vehicle traveling on a traveling lane, an adjacent traveling lane, and a next lane after the adjacent lane, in which the vehicle is traveling;
a travel information detection unit that detects travel information on travel of the vehicle;
a vehicle to be passed detection unit that detects a vehicle to be passed on the basis of the peripheral environment information and the travel information, the vehicle to be passed being a target of passing located in front of the vehicle in the traveling lane thereof;
a parallel traveling vehicle detection unit that detects a parallel traveling vehicle on the basis of the peripheral environment information, the parallel traveling vehicle traveling in the next lane after the adjacent lane;
a passing control unit that monitors the vehicle to be passed and the parallel traveling vehicle, and performs a passing maneuver with respect to the vehicle to be passed, on the basis of a monitoring result, wherein the passing maneuver includes lane changing from the traveling lane of the vehicle to the adjacent lane, acceleration control of the vehicle to pass the vehicle to be passed, and returning to the original traveling lane; and
a notification unit that issues a notification about a control status performed by the passing control unit.

2. The travel control apparatus for a vehicle according to claim 1, wherein, in at least either one of the case where passing control with respect to the vehicle to be passed has been started and the case where lane changing has been made for the purpose of passing control, the passing control unit implements control for suspending the passing maneuver when at least either one of following cases occurs: a position of the parallel traveling vehicle is predicted to be within a predetermined range from the subject vehicle; and it is detected that the parallel traveling vehicle intends to perform lane changing to the lane to which the subject vehicle performs lane changing in order to pass the vehicle to be passed.

3. The travel control apparatus for a vehicle according to claim 2, wherein the predetermined range from the subject vehicle is a predetermined range in the lane to which the subject vehicle performs lane changing in order to pass the vehicle to be passed.

4. The travel control apparatus for a vehicle according to claim 1, wherein, when the parallel traveling vehicle is located in front of the subject vehicle when the subject vehicle performs lane changing in order to pass the vehicle to be passed, and a predetermined space is detected in the lane where the parallel traveling vehicle was originally present, then the passing control unit is allowed to implement control of lane changing to the space by a steering control unit.

5. The travel control apparatus for a vehicle according to claim 3, wherein, when the parallel traveling vehicle is located in front of the subject vehicle when the subject vehicle performs lane changing in order to pass the vehicle to be passed, and a predetermined space is detected in the lane where the parallel traveling vehicle was originally present, then the passing control unit is allowed to implement control of lane changing to the space by a steering control unit.

6. The travel control apparatus for a vehicle according to claim 1, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the rear of the following vehicle in the original lane, when the following vehicle in the original lane passes the subject vehicle and it is possible to ensure a predetermined distance between the subject vehicle and the vehicle behind the subject vehicle in the original lane.

7. The travel control apparatus for a vehicle according to claim 2, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the rear of the following vehicle in the original lane, when the following vehicle in the original lane passes the subject vehicle and it is possible to ensure a predetermined distance between the subject vehicle and the vehicle behind the subject vehicle in the original lane.

8. The travel control apparatus for a vehicle according to claim 3, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the rear of the following vehicle in the original lane, when the following vehicle in the original lane passes the subject vehicle and it is possible to ensure a predetermined distance between the subject vehicle and the vehicle behind the subject vehicle in the original lane.

9. The travel control apparatus for a vehicle according to claim 1, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the original lane in front of the following vehicle in the original lane, when the following vehicle in the original lane is behind the subject vehicle by more than a predetermined distance and the relative speed of the following vehicle in the original lane with respect to the subject vehicle indicates that the vehicle and the following vehicle in the original lane are becoming distant from each other.

10. The travel control apparatus for a vehicle according to claim 2, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the original lane in front of the following vehicle in the original lane, when the following vehicle in the original lane is behind the subject vehicle by more than a predetermined distance and the relative speed of the following vehicle in the original lane with respect to the subject vehicle indicates that the vehicle and the following vehicle in the original lane are becoming distant from each other.

11. The travel control apparatus for a vehicle according to claim 3, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by a steering control unit to return to the original lane in front of the following vehicle in the original lane, when the following vehicle in the original lane is behind the subject vehicle by more than a predetermined distance and the relative speed of the following vehicle in the original lane with respect to the subject vehicle indicates that the vehicle and the following vehicle in the original lane are becoming distant from each other.

12. The travel control apparatus for a vehicle according to claim 4, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by the steering control unit to return to the original lane in front of the following vehicle in the original lane, when the following vehicle in the original lane is behind the subject vehicle by more than a predetermined distance and the relative speed of the following vehicle in the original lane with respect to the subject vehicle indicates that the vehicle and the following vehicle in the original lane are becoming distant from each other.

13. The travel control apparatus for a vehicle according to claim 5, further comprising a following vehicle in original lane detection unit that detects a following vehicle behind the subject vehicle in the traveling lane thereof, as a following vehicle in an original lane, on the basis of the peripheral environment information, the original lane being the traveling lane, wherein, in the case where the subject vehicle has performed lane changing in order to pass the vehicle to be passed and acceleration control with respect to the vehicle to be passed has been substantially suspended, the passing control unit is allowed to implement return control by the steering control unit to return to the original lane in front of the following vehicle in the original lane, when the following vehicle in the original lane is behind the subject vehicle by more than a predetermined distance and the relative speed of the following vehicle in the original lane with respect to the subject vehicle indicates that the vehicle and the following vehicle in the original lane are becoming distant from each other.

14. A travel control apparatus, comprising:

one or more of a stereo camera configured to capture images of a peripheral environment of a subject vehicle, including a vehicle traveling on a traveling lane, an adjacent traveling lane, and a next lane after the adjacent lane, or a radar configured to receive reflected waves from objects present in the peripheral environment;

a travel information detection unit that detects travel information on travel of the subject vehicle, including at least a velocity sensor;

a controller configured to:
 recognize peripheral environment information on peripheral environment in which the subject vehicle equipped with the travel control apparatus is traveling, based on information from the one or more of the stereo camera or the radar;
 detect a preceding vehicle to be passed on the basis of the peripheral environment information and the travel information, the preceding vehicle to be passed being a target of passing located in front of the subject vehicle in the traveling lane thereof;
 detect a parallel traveling vehicle on the basis of the peripheral environment information, the parallel traveling vehicle traveling in the next lane after the adjacent lane;
 monitor the preceding vehicle to be passed and the parallel traveling vehicle, and perform a passing maneuver with respect to the preceding vehicle to be passed, on the basis of a monitoring result, wherein the passing maneuver includes lane changing from the traveling lane of the subject vehicle to the adjacent lane, acceleration control of the subject vehicle to pass the preceding vehicle to be passed, and returning to the original traveling lane; and a notification unit that issues a notification about a control status, wherein the notification unit includes one or more of a display device configured to display a visual notification and a speaker configured to issue an audible notification.

* * * * *